United States Patent [19]
Fujiwara et al.

[11] Patent Number: 6,009,739
[45] Date of Patent: Jan. 4, 2000

[54] METHOD FOR EVALUATING PERFORMANCE OF CHEMICAL FILTER FOR CLEANING GAS

[75] Inventors: Kunio Fujiwara; Takeshi Takai; Mari Katsumine; Kazuo Iwaki; Hideo Kawazu, all of Kanagawa-ken; Hideaki Sekiguchi, Chiba-ken, all of Japan

[73] Assignee: Ebara Corporation, Tokyo, Japan

[21] Appl. No.: 08/993,988

[22] Filed: Dec. 18, 1997

[30] Foreign Application Priority Data

| Dec. 18, 1996 | [JP] | Japan | 8-338457 |
| Dec. 18, 1996 | [JP] | Japan | 8-338458 |
| Dec. 11, 1997 | [JP] | Japan | 9-341615 |

[51] Int. Cl.$^7$ .................................................. G01N 21/00
[52] U.S. Cl. ...................... 73/1.02; 73/24.04; 73/29.01; 73/863.23
[58] Field of Search .............................. 73/38, 1.02, 1.06, 73/24.04, 73, 863.23, 863.24, 863.25, 45.2, 28.01, 28.03, 29.01, 29.03, 77; 55/486

[56] References Cited

U.S. PATENT DOCUMENTS

| 2,921,157 | 1/1960 | Stein . | |
| 4,014,209 | 3/1977 | Emerick | 73/119 |
| 4,120,194 | 10/1978 | Reuland | 73/45.2 |
| 4,751,501 | 6/1988 | Gut | 340/607 |
| 5,036,698 | 8/1991 | Conti | 73/38 |
| 5,200,628 | 4/1993 | Ikeda et al. . | |
| 5,376,278 | 12/1994 | Salem | 210/679 |
| 5,395,411 | 3/1995 | Kobayashi | 55/486 |
| 5,477,731 | 12/1995 | Mouton | 73/38 |
| 5,743,940 | 4/1998 | Sugo et al. . | |
| 5,783,608 | 7/1998 | Sugo et al. . | |

FOREIGN PATENT DOCUMENTS

| 0379975 | 8/1990 | European Pat. Off. . |
| 0708328 | 4/1996 | European Pat. Off. . |
| 4408647 | 9/1994 | Germany . |
| 1197644 | 8/1989 | Japan . |
| 3161020 | 7/1991 | Japan . |
| 3232513 | 10/1991 | Japan . |
| 5107239 | 4/1993 | Japan . |
| 2066693 | 7/1981 | United Kingdom . |

OTHER PUBLICATIONS

European–596441 Abstract.

*Primary Examiner*—Hezron Williams
*Assistant Examiner*—Thuy Vinh Tran
*Attorney, Agent, or Firm*—Browdy and Neimark

[57] ABSTRACT

A method for evaluating performance of a chemical filter element is disclosed. A moisture content, a weight or a pressure loss of a filter element including an ion exchanger is determined, and the determined value is compared with a prescribed value. Alternatively, the determined value is converted into a residual ion exchange capacity of the filter element, and the residual ion exchange capacity is compared with a prescribed value. When the determined value or the residual ion exchange capacity is equal to or less than the prescribed value, the filter element is exchanged. On the other hand, when the determined value or the residual ion exchange capacity is more than the prescribed value, after waiting a prescribed period, the determining step and the comparing step are repeated.

42 Claims, 10 Drawing Sheets

METHOD FOR EVALUATING PERFORMANCE OF CHEMICAL FILTER FOR CLEANING GAS

BACKGROUND OF THE INVENTION

The present invention relates to a method for evaluating performance of a chemical filter, including ion exchangers, for cleaning a gas. The chemical filter has recently been used in clean rooms in the microelectronics industry such as semiconductor industry or pharmaceutical industry. Namely, the present invention relates to performance evaluation of air-cleaning chemical filter, which can provide information about the time for replacing a chemical filter, such as consumed ion-exchange capacity or residual exchange capacity of the filter material, or which can assess whether or not the analytical level of a component to be removed at the inlet and outlet of a filter is correct without destroying the filter. The present invention is also applicable to quality control during the manufacture process of ion exchangers which constitute air-cleaning chemical filter.

Known chemical filter for removing gaseous components in the air includes activated carbon particles or activated carbon fiber on which an acid or alkali is optionally deposited. Filters comprising an oxide or a metal supported on other carriers are also known.

In recent years, chemical filters using ion exchangers have begun to be used particularly in the semiconductor-related industry, because they can efficiently remove gaseous components at ppb levels without releasing adsorbates.

Ion exchangers are often used in chemical filters in the form of a non-woven or woven fabric because of the high removal efficiency, light weight and formability. Ion-exchange groups include cation-exchange groups such as sulfuric acid and carboxyl groups, as well as anion-exchange groups such as quaternary ammonium and tertiary amino groups. The mechanism by which these ion-exchange groups remove gaseous components is mainly based on a neutralization reaction. Thus, the ion-exchange capacity gradually decreases as a filter using such an ion-exchange group continues to be used. As the consumed ion-exchange capacity increases, the removal efficiency for gaseous components declines, and therefore, the filter must be replaced.

The time for replacing a filter for removing microparticle such as HEPA filter or ULPA filter can be known from pressure loss. However, it is difficult to estimate the time for replacing a chemical filter. Typically, concentrations of gaseous components of interest are determined in an upstream and a downstream of the chemical filter, and a decline in removal rate thereof is an indicator for the replacement.

However, extended suction with an impinger and careful analysis of the absorbed liquid are needed to determine an extremely low gas level in an environment which requires a chemical filter. This involves the possibility that gaseous components to be removed may not be removed by the chemical filter but continue to flow out for a long period and contaminate the surface of semiconductor products before the results come out. In addition, it is very difficult to sample trace gas components, and many samplings are necessary to know if a sampling site is typical of filter performance even if the analytical value is correct. Such an analysis is laborious and time-consuming.

The lifetime of ion exchangers can relatively easily be calculated from concentrations of gas components in a gas, since they are chemical adsorbents in contrast to physical adsorbents such as activated carbon. Thus, the gas level may be determined as described above when the lifetime approaches its end, but the gas concentrations at the inlet is seldom constant. Therefore, the gas level must be regularly analyzed until the removal efficiency declines. This can not solve the above problems. An alternative solution is to replace any filter used for some period even if it still has a remaining ion-exchange capacity, i.e. the capacity to remove gaseous components.

Such a method not only go against the trend to save resources and energy, but also raises costs. Under the present situation, there have been eager demands for a method which can directly and rapidly indicate the time for replacing a chemical filter without destroying or contacting it, and which can eliminate the complexity of the prior art involving indirect determination of the time for replacing a filter by analyzing the level of a trace gas component in the air upstream and downstream of the filter.

Further, it was difficult to determine when and which filter should be replaced in case of large area air-cleaning which usually requires a plurality of filters, because a constant flow can not always be obtained in such a case or if it could be obtained, the gaseous component level is not always constant so that the consumed ion-exchange capacity varies for each filter.

SUMMARY OF THE INVENTION

The present invention is based on the discovery that a moisture content, a weight and a pressure loss of a filter element including an ion exchanger decreases as the filter element adsorbs gas components. In the initial stage of the ion exchanger in the filter element, a considerable water molecules are associated through hydrogen bond. However, as the filter element is used to adsorb gas components by an ion exchange group such as a sulfonic acid group in the ion exchanger, it is speculated that the number of associated water molecules decreases, thereby decreasing the moisture content, weight and pressure loss of the filter element. Therefore, decrease of the moisture content, weight or pressure loss of the filter element to a certain extent shows adsorption of gas components onto the ion exchange group in the ion exchanger and the timing for replacing the filter element.

In the first and second aspects of the present invention, a moisture content or a weight of the filter element is an indicator to replace the filter element. In contrast, in the second and fourth aspects of the present invention, a pressure loss at the filter element is an indicator to replace the filter element.

In the first and the third aspects of the present invention, a moisture content, a weight or a pressure loss of the filter element is a direct indicator, and therefore it is not necessary to obtain residual ion exchange capacity of the filter element. In contrast, in the second and fourth aspects of the present invention, a moisture content, a weight or a pressure loss of the filter element is converted into residual ion exchange capacity of the filter element by a calibration curve, and the residual ion exchange capacity is a direct indicator for replacing the filter element. In the fifth aspect of the present invention, after estimating broad timing of replacing the filter by the pressure loss at the filter element, then estimating fine timing by the moisture content or the weight of the filter element.

According to the first aspect of the present invention, it is provided that a method for evaluating performance of a chemical filter element for cleaning a gas, which method comprising the steps of: determining a moisture content or a weight of a filter element including an ion exchanger; comparing the determined value of a moisture content or a weight with a prescribed value of a moisture content or a weight; replacing the filter element when the determined value is equal to or less than the prescribed value; and waiting a prescribed period when the determined value is more than the prescribed value and repeating the determining step and the comparing step subsequent to the waiting step; wherein the prescribed value of a moisture content or a weight is smaller than an initial value of a moisture content or a weight of the filter element.

In the first aspect of the present invention, preferably, the method further comprises the step of maintaining the filter element at a prescribed temperature and a prescribed humidity prior to the determining step.

According to the second aspect of the present invention, it is provided that a method for evaluating performance of a chemical filter element for cleaning a gas, which method comprising the steps of: determining a moisture content or a weight of a filter element including an ion exchanger; converting the determined value of a moisture content or a weight into a residual ion exchange capacity of the filter element; and comparing the residual ion exchange capacity with a prescribed value.

In the second aspect of the present invention, preferably, the method further comprises the step of replacing the filter element when the residual ion exchange capacity is equal to or less than the prescribed value. Preferably, the method further comprises the step of waiting a prescribed period when the residual ion exchange capacity is more than the prescribed value and repeating the determining step, the converting step and the comparing step subsequent to the waiting step.

Preferably, the prescribed value for the residual ion exchange capacity ranges from 20% to 40% of an initial ion exchange capacity of the filter element.

Preferably, the method further comprises the steps of: maintaining the filter element at a prescribed temperature and a prescribed humidity prior to the determining step; and obtaining a calibration curve between a moisture content or a weight of the filter element and a residual ion exchange capacity of the filter element; wherein the converting step comprises employing the calibration curve.

Preferably, the determining step comprises the steps of: irradiating at least one of an infrared ray and a near infrared ray onto a surface of the filter element; and detecting at least one of an infrared ray and a near infrared ray reflected from the surface of the filter element. Preferably, the determining step further comprises the step of determining a moisture content of the filter element.

According to the third aspect of the present invention, it is provided a method for evaluating performance of a chemical filter element for cleaning a gas, which method comprising the steps of: providing a filter element including an ion exchanger in a gas passage; determining a pressure difference between an upstream and a downstream of the filter element; comparing the determined value of a pressure difference with a prescribed value of a pressure difference; replacing the filter element when the determined value is equal to or less than the prescribed value; and waiting a prescribed period when the determined value is more than the prescribed value and repeating the determining step and the comparing step subsequent to the waiting step; wherein the prescribed value of a pressure difference is smaller than an initial value of a pressure difference between an upstream and a downstream of the filter element.

In the third aspect of the present invention, preferably, the method further comprises the step of maintaining the filter element at a prescribed temperature and a prescribed humidity prior to the determining step.

According to the fourth aspect of the present invention, it is provided that a method for evaluating performance of a chemical filter element for cleaning a gas, which method comprising the steps of: providing a filter element including an ion exchanger in a gas passage; determining a pressure difference between an upstream and a downstream of the filter element; converting the determined value of a pressure difference into a residual ion exchange capacity; and comparing the residual ion exchange capacity with a prescribed value.

In the fourth aspect of the present invention, preferably, the method further comprises the step of replacing the filter element when the residual ion exchange capacity is equal to or less than the prescribed value. Preferably, the method further comprises the step of waiting a prescribed period when the residual ion exchange capacity is more than the prescribed value and repeating the determining step, the converting step and the comparing step subsequent to the waiting step. Preferably, the method further comprises the steps of: maintaining the filter element at a prescribed temperature and a prescribed humidity prior to the determining step; and obtaining a calibration curve between a residual ion exchange capacity of the filter element and a pressure difference between an upstream and a downstream of the filter element; wherein the converting step comprises employing the calibration curve.

In the fifth aspect of the present invention, it is provided that a method for evaluating performance of a chemical filter element for cleaning a gas, which method comprising the steps of: providing a filter element including an ion exchanger in a gas passage; determining a pressure difference between an upstream and a downstream of the filter element; comparing the determined value of a pressure difference with a prescribed value of a pressure difference; determining a moisture content or a weight of the filter element when the determined value of a pressure difference is equal to or less than the prescribed value; and waiting a prescribed period when the determined value of a moisture content or a weight is more than the prescribed value and repeating the pressure-difference determining step, and the comparing step subsequent to the waiting step; wherein the prescribed value of a pressure difference is smaller than an initial value of a pressure difference.

Preferably, the method further comprises the steps of: comparing the determined value of a moisture content or a weight of the filter element with a prescribed value of a moisture content or a weight; replacing the filter element when the determined value of a moisture content or a weight is equal to or less than the prescribed value; and waiting a prescribed period when the determined value of a moisture content or a weight is more than the prescribed value and repeating the pressure-difference determining step and the pressure-difference comparing step subsequent to the waiting step wherein the prescribed value of a moisture content or a weight is smaller than an initial value of a moisture content or a weight.

Alternatively, the method may further comprise the steps of: converting the determined value of a moisture content or a weight into a residual ion exchange capacity of the filter element; and comparing the residual ion exchange capacity with a prescribed value. Preferably, the method further comprises the step of replacing the filter element when the residual ion exchange capacity is equal to or less than the prescribed value. Preferably the method further comprises the step of waiting a prescribed period when the residual ion exchange capacity is more than the prescribed value and repeating the pressure-difference determining step and the pressure-difference comparing step subsequent to the waiting step.

Preferably, the method further comprises the step of maintaining the filter element at a prescribed temperature and a prescribed humidity prior to the pressure-difference determining step. Preferably, the moisture-content-or-weight determining step comprises the steps of: irradiating at least one of an infrared ray and a near infrared ray onto a surface of the filter element; and detecting at least one of an infrared ray and a near infrared ray reflected from the surface of the filter element.

In the first, second, third, fourth and fifth aspects of the present invention, preferably, a filter assembly comprises a housing and the filter element being fixed to the housing, and the replacing step includes replacing the filter assembly. Preferably, another filter element is provided in an upstream of the filter element. Preferably, the ion exchanger comprises an ion exchange group having strong acidity or strong basicity. Preferably, the ion exchanger is made by irradiation-induced graft polymerization.

DETAILED DESCRIPTION OF THE PREFERRED EMBODIMENTS

Figure 8:
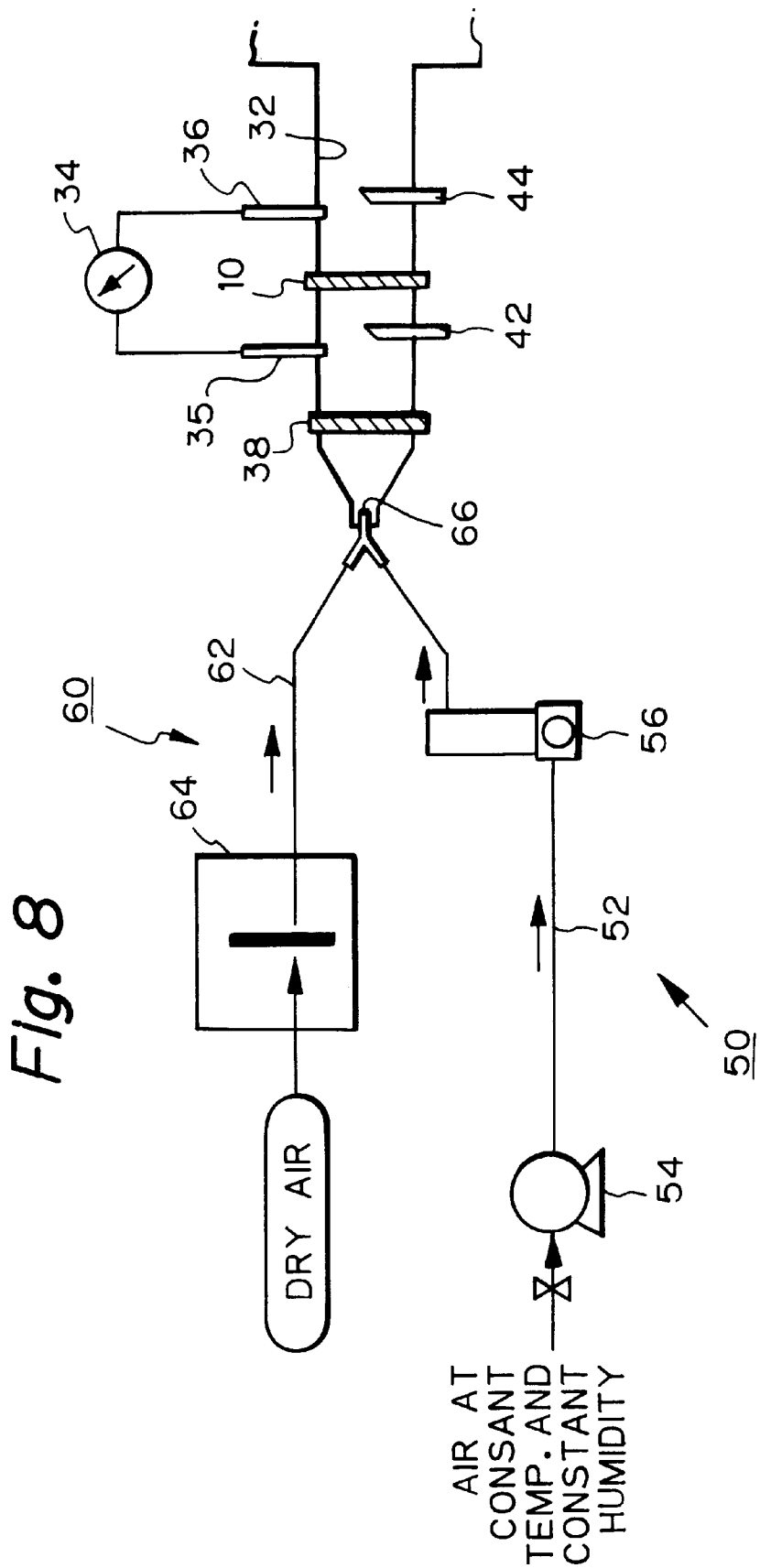
FIG. 8 is a schematic view showing a determining step of the present invention.

In FIG. 8, a filter assembly 10 including a filter element 14 is disposed in a gas passage 32. In the third, fourth and fifth aspects of the present invention, a differential pressure gauge 34 is provided for determining a pressure difference between an upstream 35 and a downstream 36 of the filter element 14. In the gas passage 32, sampling lines 42, 44 are provided for sampling a gas in the passage. However, the sampling lines 42, 44 are used in the Examples so as to confirm the principal of the present invention, and thus not essential features of the present invention.

Figure 9:
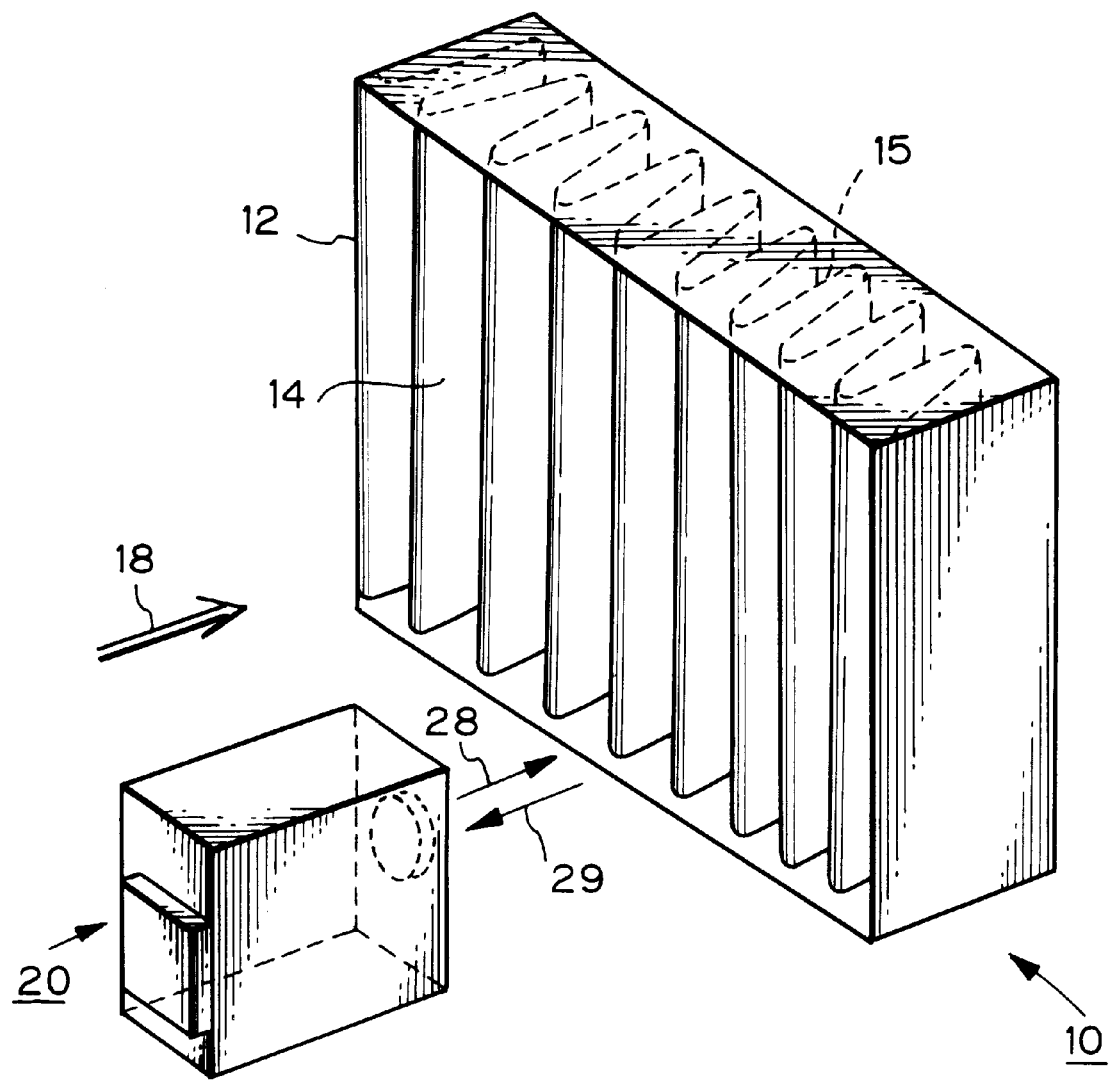
FIG. 9 is a perspective view showing a filter assembly and an infrared moisture meter, which can be used in a method of the present invention.

As shown in FIG. 9, the filter assembly 10 has a housing 12 and a filter element 14 including an ion exchanger. The housing 12, for example, may be made of plastic material such as polypropylene. When the filter assembly 10 is used in a clean room, the housing 12 is preferably made of high-purity plastic material. The filter element 14 in a pleated configuration is fixed to the housing 12 by means of a seal agent such as an adhesive. Reference numeral 15 refers to a shape of the filter element 14 in a cross section thereof. The filter element 14 includes an ion exchanger, and typically is composed of the ion exchanger. An ion exchanger in a fiber configuration may be processed into a woven fabric, non-woven fabric, which serves as a filter element 14.

In its use, the filter assembly 10 may be fixed to a duct for introducing air into a clean room. The filter assembly 10 may be fixed to a stepper, an air knife and so on at a mechanism for introducing air. Alternatively, a plurality of filter assemblies 10 may be fixed to one side of a whole wall in a clean room.

A gas including an ionic matter is introduced into the filter assembly 10 in a flow direction 18. The ion exchanger in the filter element 14 adsorbs the ionic matter in the gas, thereby removing thereof. The filter element 14 can adsorb basic gases such as ammonia and trimethylamine as well as acidic gases such as hydrogen chloride, hydrogen fluoride, organic acids, sulfur oxides, nitrogen oxides, etc. As the ion exchanger adsorbs these ionic matter, the filter element decreases its efficiency for removing thereof. In the first and the second aspects of the present invention, a moisture content or a weight of the filter element 14 is determined so as to judge timing of replacing the filter element 14 or the filter assembly 10.

Figure 4:
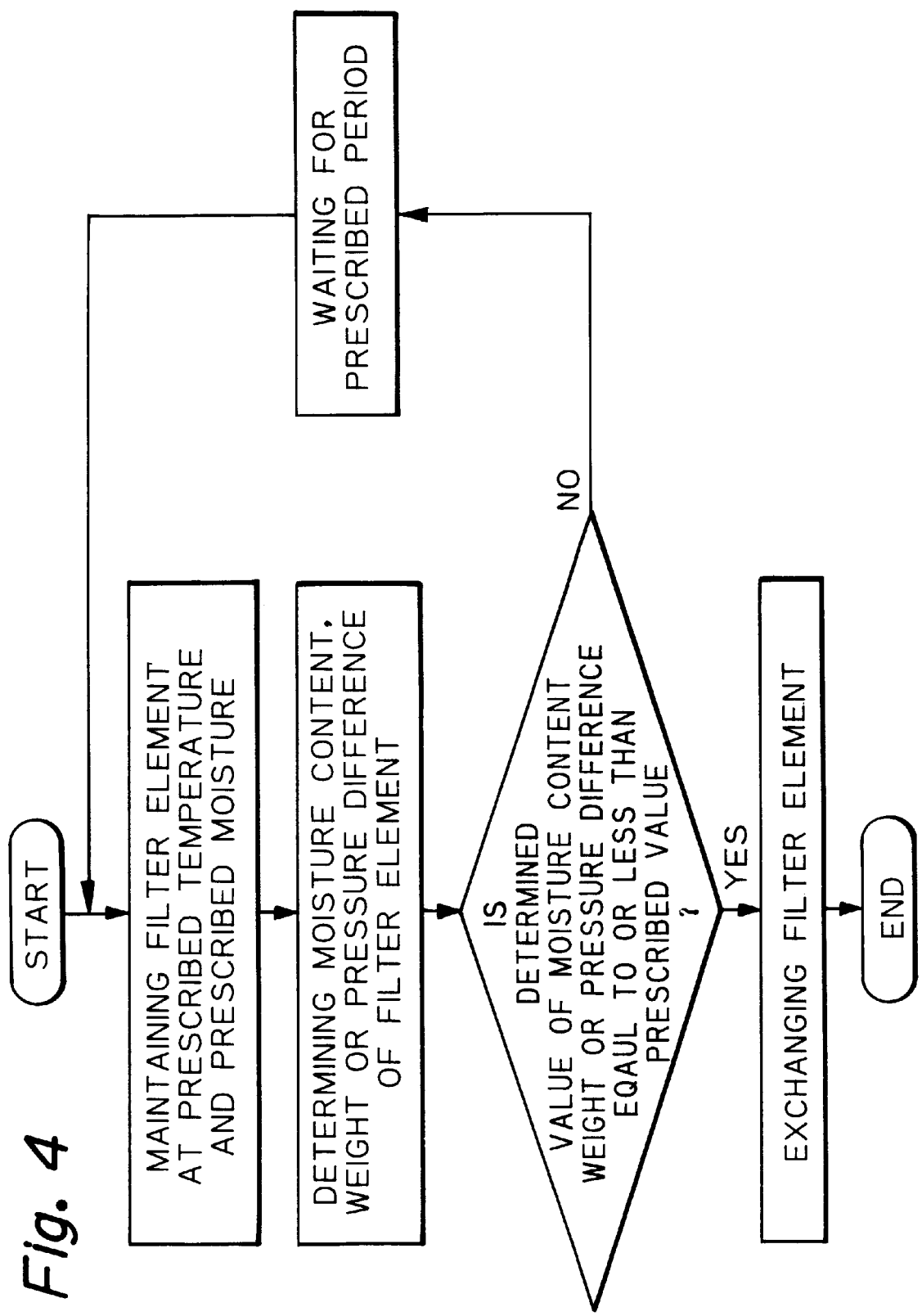
FIG. 4 is a flow chart showing one embodiment of the present invention.

FIG. 4 shows the first and the third aspects of the present invention. In the maintaining step 71, preferably, the filter assembly 10 and particularly the filter element 14 are maintained at a prescribed temperature and a prescribed humidity since a moisture content and a weight of the filter element depend on temperature and humidity. In a clean room, temperature and humidity are kept constant. Therefore, when the filter assembly is disposed in a clean room, the requirement is necessarily met. The prescribed temperature and the prescribed humidity may differ from those where the filter assembly 10 are in use.

Subsequently, in the determining step 32, a moisture content or a weight of the filter element 14 is determined. Alternatively, as shown in FIG. 8, a pressure difference, which may be referred to a pressure loss, between an upstream 35 and a downstream 36 of the filter element 14 is determined. Preferably, during the determining step, the aforementioned prescribed temperature and the prescribed humidity in the maintaining step 71 are maintained.

The moisture content is preferably determined by employing an infrared and/or near infrared ray. As shown in FIG. 9, an infrared and/or near infrared ray 28 may be irradiated onto a surface of the filter element 14 from a light source of the infrared moisture meter 20, and a detecting unit of the infrared moisture meter 20 may detect an infrared and/or near infrared ray 29 reflected from the surface of the filter element 14. The infrared and/or near infrared ray may be irradiated onto either an upstream surface or a downstream surface of the filter element 14. Alternatively, an infrared and/or near infrared ray passing through the filter element 14 may be detected. Known infrared moisture meter, for example, moisture meter JE-100 commercially available from JT Engineering Inc., Japan may be used. The infrared moisture meter 20 may produce an indicated value, which may be converted into a moisture content by a calibration curve.

Subsequently, in the comparative step 74, the determined value of a moisture content, a weight or a pressure difference is compared with a respective prescribed value. When the determined value of a moisture content, a weight or a pressure difference is equal to or less than the respective prescribed value, in the replacing step 75, the filter element 14 is replaced, and preferably the filter assembly 10 is replaced. On the other hand, when the determined value of a moisture content, a weight or a pressure difference is more than the respective prescribed value, the filter element 14 or the filter assembly 10 may be continued to be in use as it is, and, after waiting for a prescribed period in the waiting step 76, the determining step 72 and the comparing step 74 are repeated. Preferably, the maintaining step 71, the determining step 72 and the comparing step 74 are repeated.

Figure 5:
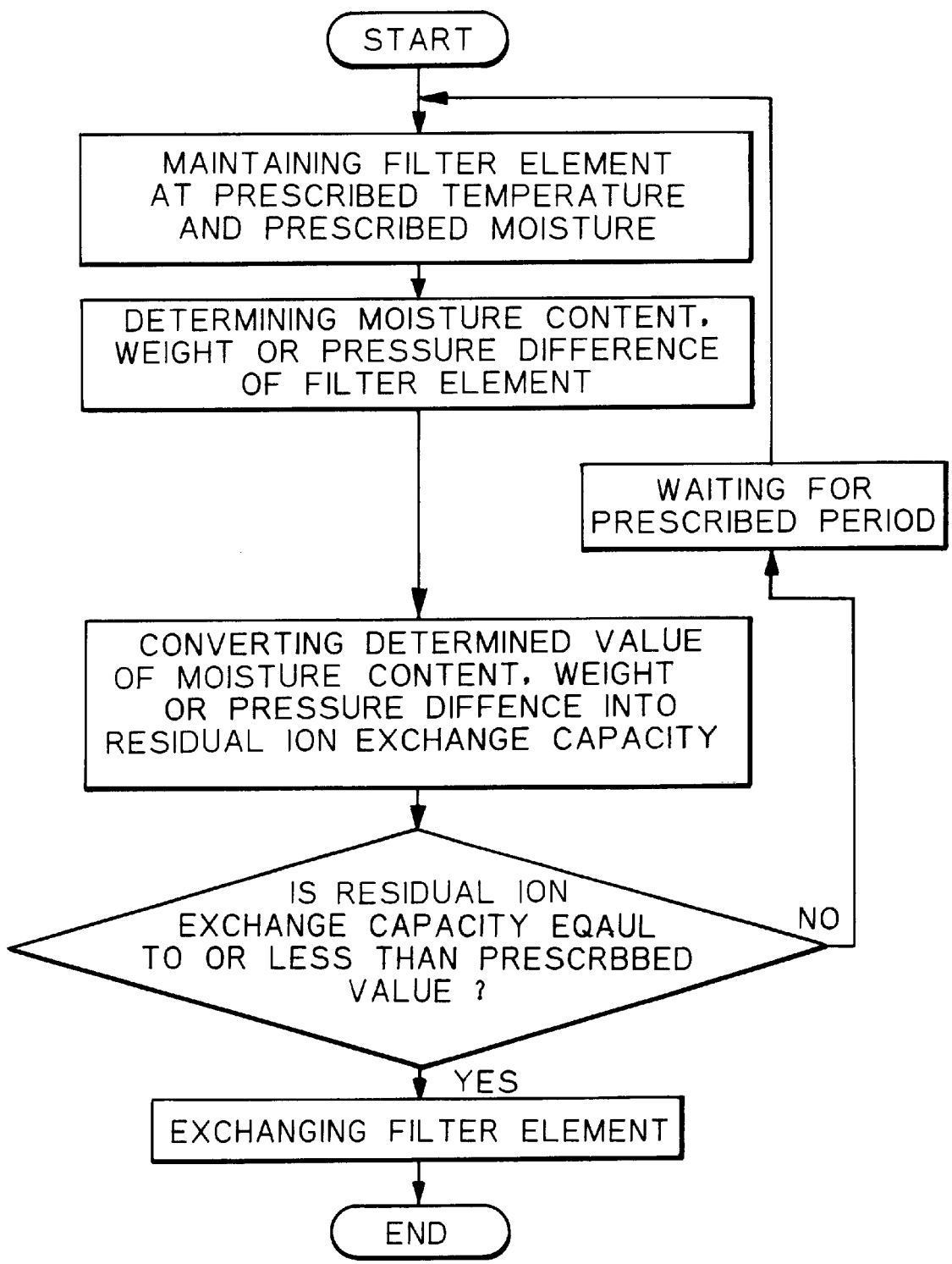
FIG. 5 is a flow chart showing another embodiment of the present invention.

FIG. 5 shows the second and fourth aspects of the present invention. Methods in accordance with the second and fourth aspects of the present invention have the same maintaining step 81 and the determining step 82 as the maintaining step 71 and the determining step 72, respectively.

Figure 1:
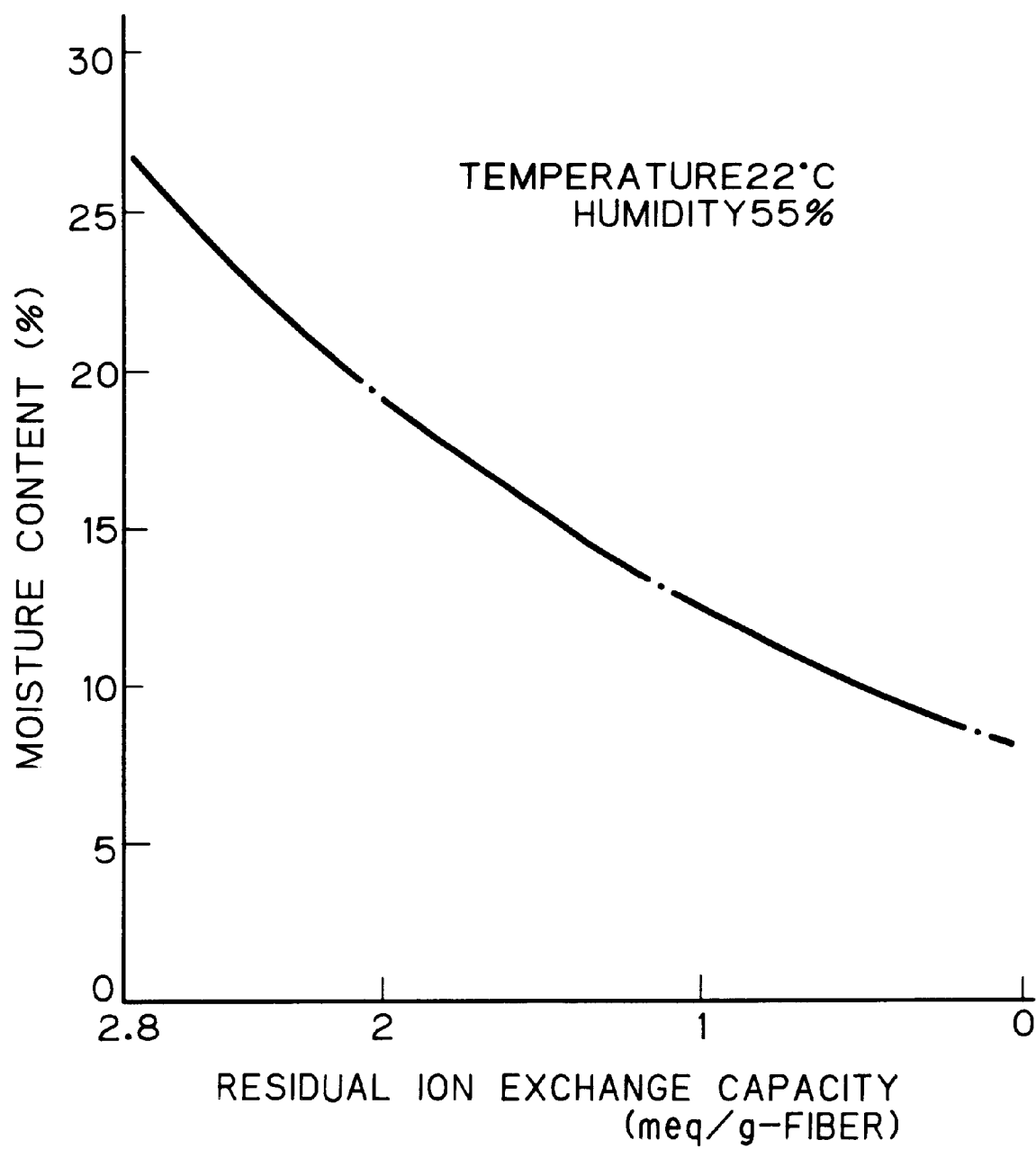
FIG. 1 is a graph showing the correlation between the residual ion exchange capacity and moisture content in a strongly acidic, cation-exchange fiber at a constant temperature and a constant humidity.

Subsequently, in the converting step 83, the determined value of a moisture content, a weight or a pressure difference is converted into a residual ion exchange capacity of the filter element 14. Preferably, a calibration curve between a moisture content, a weight or a pressure difference of the filter element and a residual ion exchange capacity of the filter element is obtained beforehand, and the determined value of a moisture content, a weight or a pressure difference is compared with the calibration curve to obtain the residual ion exchange capacity. Such calibration curve is illustrated in FIG. 1. Preferably, the prescribed temperature and the prescribed humidity in the maintaining step 81 are the same as those where the calibration curve is obtained.

Subsequently, in the comparing step, the residual ion exchange capacity obtained is compared with a prescribed value thereof. When the residual ion exchange capacity is equal to or less than the prescribed value, preferably, the filter element 14 is replaced, and further preferably, the whole filter assembly 10 is replaced. On the other hand, when the residual ion exchange capacity is more than the prescribed value, the filter element 14 or the filter assembly 10 may be continued to be in use as it is, and, after waiting for a prescribed period in the waiting step 86, the determining step 82, the converting step 83 and the comparing step 84 may be repeated. Preferably, the maintaining step 81, the determining step 82, the converting step 83, and the comparing step 84 may be repeated. Preferably, the prescribed value of the residual ion exchange capacity ranges from 20 to 40% of an initial ion exchange capacity of the filter element.

In accordance with the fifth aspects of the present invention, after determining a pressure difference between an upstream and a downstream of the filter element, and then, in certain cases, a moisture content and a weight of the filter element is further determined. The determination of the pressure difference may not necessarily be accurate due to fluctuation of a gas flow, clogging of the filter element and so on. Therefore, monitoring a change of the pressure difference over a period of time gives a rough timing of replacing the filter element, and, if necessary, the moisture content or weight of the filter element is further determined so as to give more accurate timing of replacing the filter element.

Figure 6:
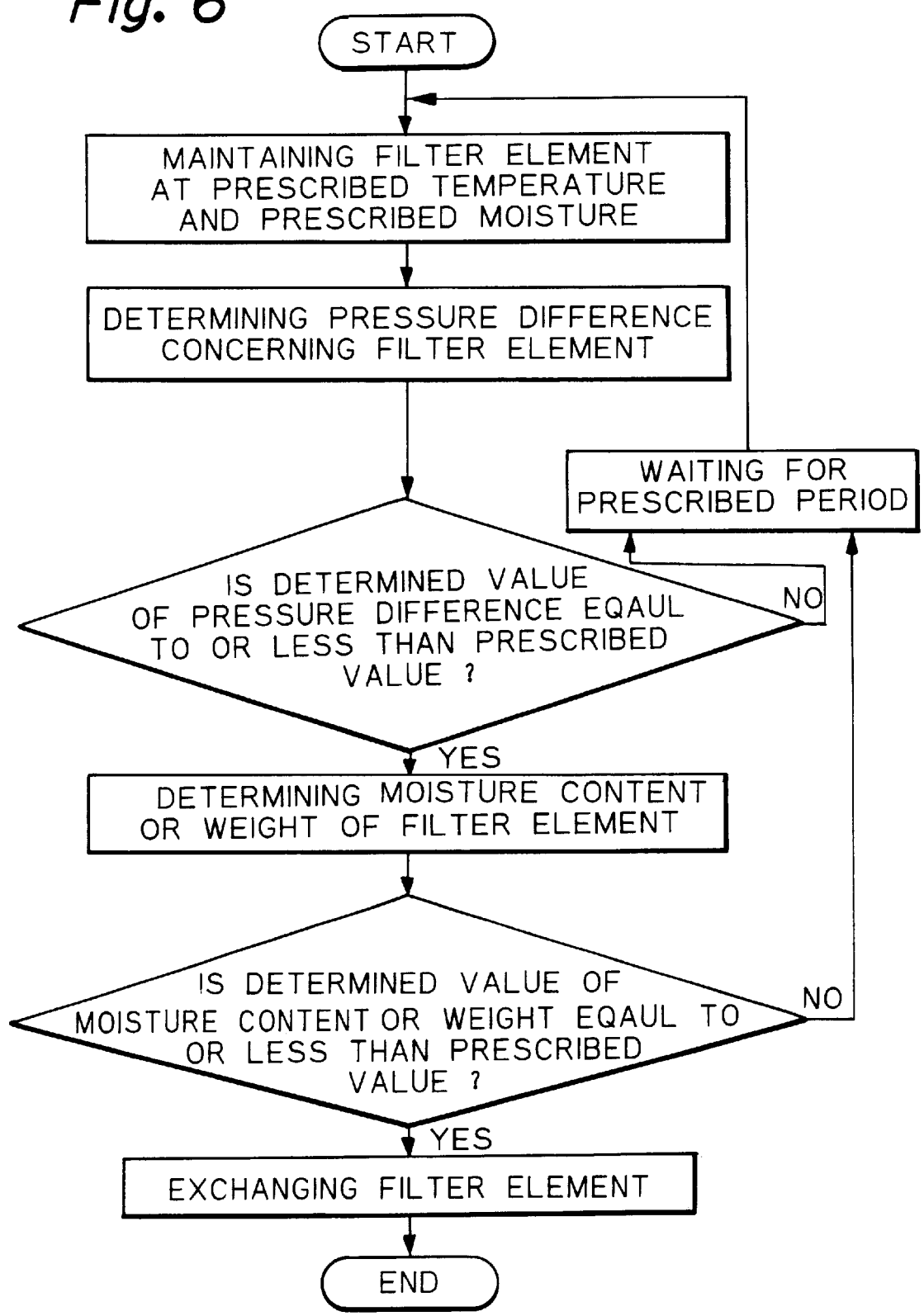
FIG. 6 is a flow chart showing another embodiment of the present invention.

FIG. 6 shows a flowchart of one embodiment of the fifth aspect of the present invention. In FIG. 6, the maintaining step 91, the pressure-difference determining step 92, and the pressure-difference comparing step 93 are the same as the steps 71, 72 and 74 of FIG. 4, respectively. When the determined value of the pressure difference is larger than the prescribed value thereof, similarly, after waiting for a prescribed period in the waiting step, the determining step 92 and the comparing step 93 are repeated, and, preferably, the maintaining step 91 is repeated also.

In the comparing step 93, when the determined value of the pressure difference is equal to or smaller than the prescribed value thereof, a moisture content or a weight of the filter element is determined in the determining step 94. Subsequently, similar to FIG. 4, in the comparative step 95, the determined value of a moisture content or a weight is compared with a respective prescribed value. When the determined value is equal to or less than the prescribed value thereof, the filter element 14 is replaced in the replacing step 98, and, preferably, the whole filter assembly 10 is replaced. On the other hand, when the determined value of a moisture content or a weight is larger than the prescribed value thereof, the filter element 10 or the filter assembly 14 is continued to be in use, and after waiting for a prescribed period in the waiting step, the pressure-difference determining step 92 and the pressure-difference comparing step may be repeated, and preferably, the maintaining step 91 is also repeated.

Figure 7:
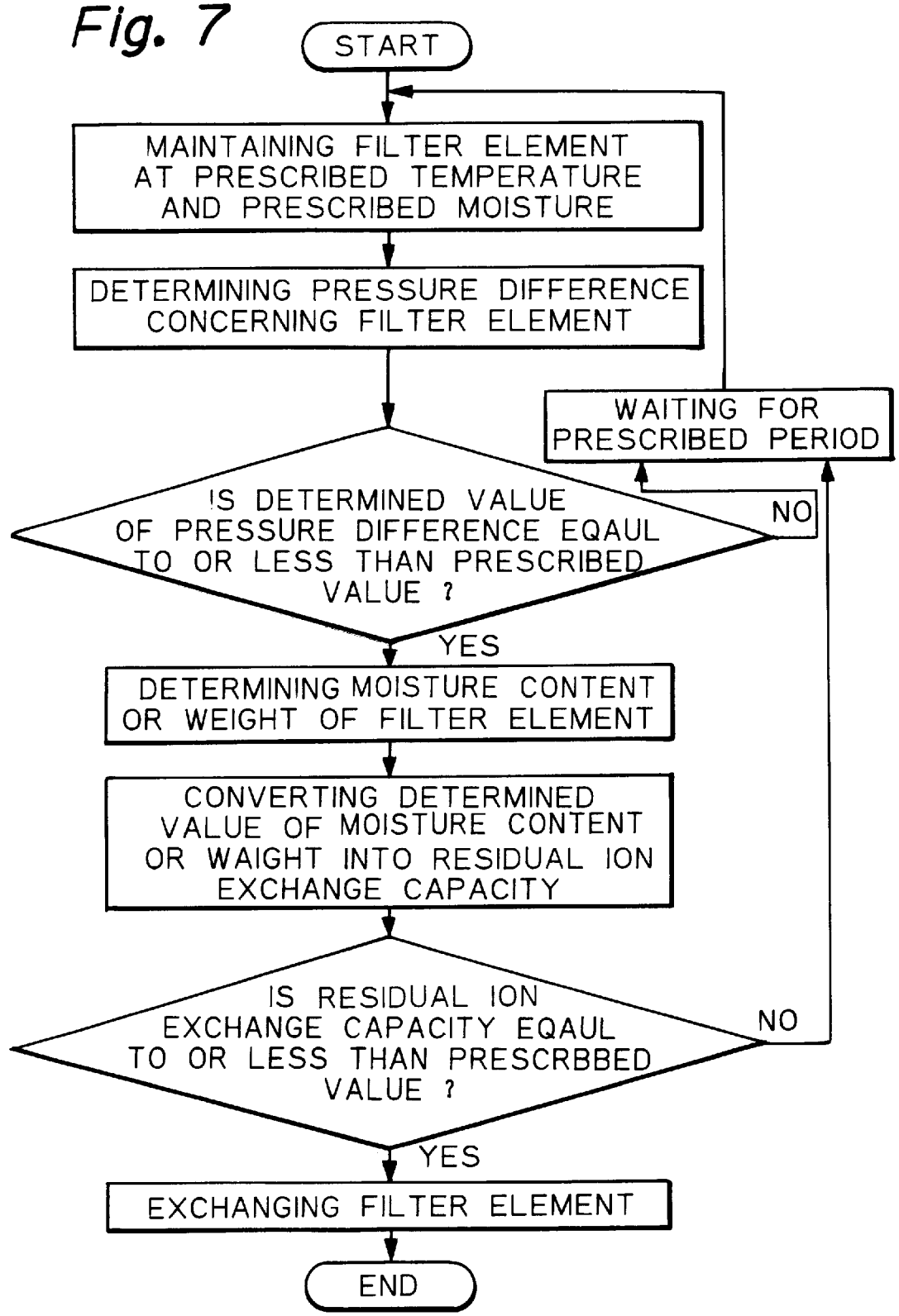
FIG. 7 is a flow chart showing another embodiment of the present invention.

FIG. 7 shows a flowchart of another embodiment of the fifth aspect of the present invention. In FIG. 7, the maintaining step, the pressure-difference determining step 92, the pressure-difference comparing step 93, and the moisture-content-or-weight determining step 94 are the same as those of FIG. 6.

In the converting step 96, similar to the converting step 83 in FIG. 5, the determined value of a moisture content or a weight is converted into a residual ion exchange capacity of the filter element 14. Subsequently, similar to FIG. 5, in the comparing step 97, the residual ion exchange capacity obtained is compared with a prescribed value. When the residual ion exchange capacity is equal to or less than the prescribed value, in the replacing step 98, preferably, the filter element 14 is replaced, and further preferably, the whole filter assembly 10 is replaced. On the other hand, when the residual ion exchange capacity is more than the prescribed value, the filter element 14 or the filter assembly 10 may be continued to be in use as it is, and, after waiting for a prescribed period in the waiting step, preferably, the pressure-difference determining step 92, and the pressure-difference comparing step 93 may be repeated. Further preferably, the maintaining step 91 also may be repeated.

The present invention is described in detail hereinafter.

The present invention is a result of the finding that the moisture content in ion exchangers varies with the amount of chemically adsorbed gaseous components.

The present invention will now be explained with reference to the case in which ammonia is mainly adsorbed by applying sulfuric acid group, which is a typical ion-exchange group of strongly acidic, cation exchangers, as an ion exchanger.

The reaction between a strongly acidic, cation exchanger having a sulfuric acid group and ammonia is represented by the following formula:

$$R\text{—}SO_3H + NH_3 \rightarrow R\text{—}SO_3NH_4.$$

The above formula shows that adsorption of ammonia to a sulfuric acid group may result in a weight gain corresponding to the molecular weight of ammonia of 17. In fact, the difference between the weights before and after adsorption of ammonia determined in dry state is consistent with the weight gain calculated from the ion-exchange capacity.

However, it was found that adsorption of ammonia results in a weight loss in filtering a regular gas at typical temperatures and humidities. For example, a non-woven fabric gives a wet touch when ammonia is not adsorbed, but it is relatively dry when ammonia is adsorbed. In the light of this phenomenon, we determined the adsorbed amount of ammonia and the resulting weight change of a strongly acidic, cation-exchange non-woven fabric having an ion-exchange capacity at a constant temperature and a constant humidity and found that the residual exchange capacity and moisture content has a correlation as shown in FIG. 1. FIG. 1 shows that a weight of the H-type, unused, strongly acidic, cation-exchange non-woven fabric is greater by even 10% or more than a weight of the same fabric after ammonia adsorption. Thus, very direct and exact information on the time for replacement can be obtained by measuring the total weight loss of the filter.

Bearing in mind that weight change results from moisture content, we further investigated the moisture content of strongly acidic, cation exchangers in the air and found that the moisture content depends on the adsorbed amount of ammonia when the temperature and humidity in the air are constant.

Figure 2:
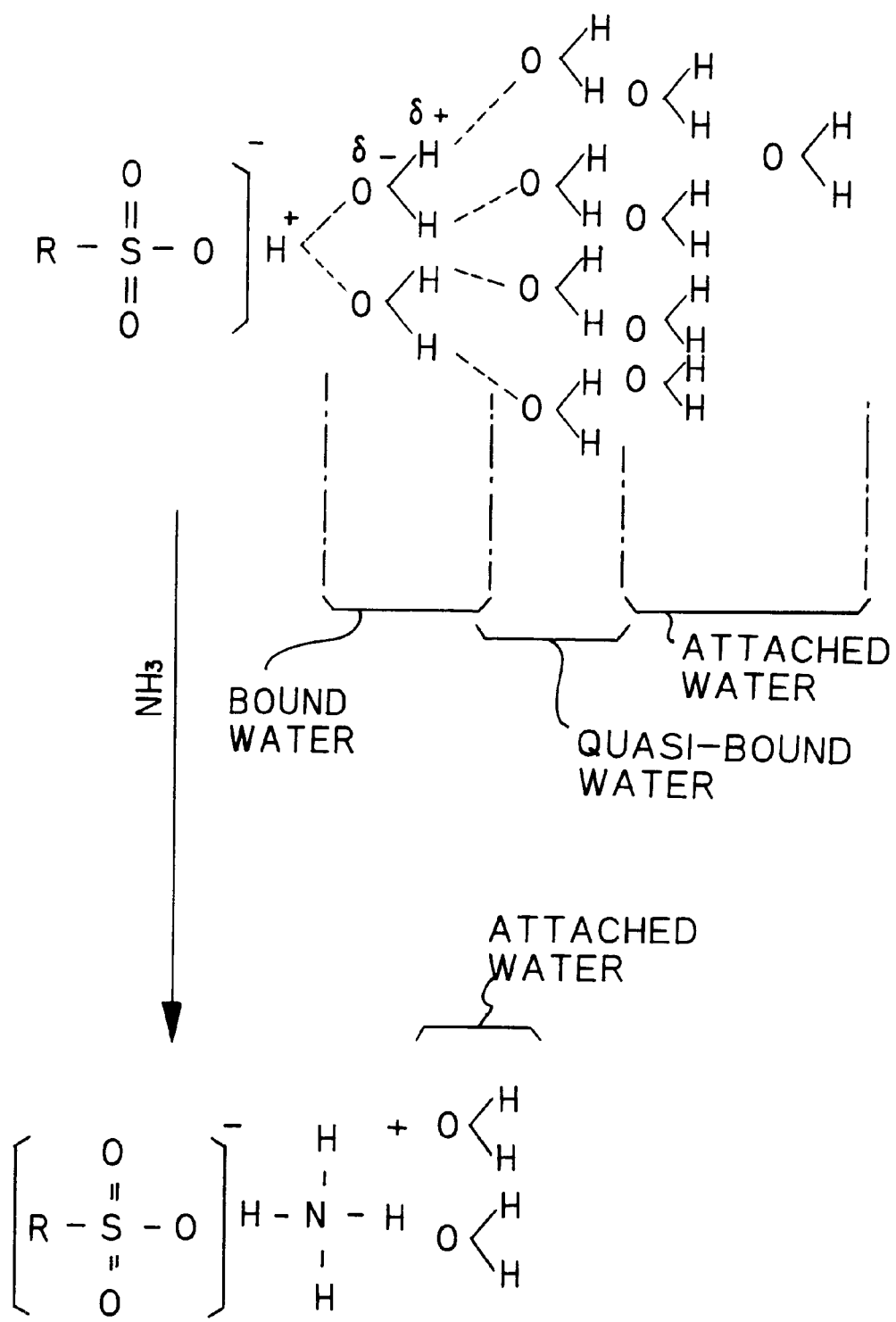
FIG. 2 is a model showing the correlation between the sulfuric acid group of a strongly acidic, ion exchanger and water molecules.

In the air with varying temperature and humidity, moisture content is also related to the temperature and humidity in the air, and the sulfuric acid group of a strongly acidic, ion exchanger and water molecules are considered to have a correlation as shown by the model of FIG. 2. Namely, the sulfuric acid group is surrounded by a layer of relatively strongly adsorbed bound water, which is in turn surrounded by a layer of more weakly adsorbed attached water. It may be assumed that an intermediate layer (quasi-bound water) exists between the attached water layer and the bound water layer.

The amount of attached water readily varies with the temperature and humidity in the air. On the other hand, the amount of bound water varies with the adsorbed amount of ammonia and decreases when it adsorbs a gas such as ammonia. Accordingly, the amount of this decrease is preferably detected at a constant temperature and a constant humidity such as a clean room.

As the temperature and humidity are always controlled at constant levels in a clean room in the semiconductor industry or the like, the amount of adsorbed gas such as ammonia can be estimated by measuring the moisture content, so that the performance and/or time for replacement of a filter can be determined.

According to the present invention, moisture content can be determined by applying ordinary techniques, preferably based on the reflection of infrared rays or near infrared rays to avoid destroying or contacting the filter material. Near infrared rays are particularly preferred because they produce less background signals and impose relatively less limitations on the shape of objects to be determined, e.g. even a pleated filter can be determined.

Preferably, as shown in FIG. 8, another prefilter 38 is disposed in an upstream of the filter element 14. The prefilter 38 is capable of removing microparticles, dusts, and so on for preventing a weight increase and an increased pressure loss of the filter element 14, thereby allowing to accurately determine the weight and pressure loss. Moreover, the prefilter may prevent coloring of the filter element 14, thereby allowing accuracy in the determination by the infrared/ near infrared ray. The prefilter 38 may or may not include an ion exchanger.

According to the present invention, it is also preferable to determine moisture content by measuring the weight of a chemical filter as described above in the following manner, for example:

(1) Cross-current filter

It is difficult to continuously determine the weight of this filter which is designed to pass a flow through the filter material and therefore fixed to prevent air leakage from other parts than the filter. Thus, the filter is removed and the total weight of the filter is determined. Some time and labor are needed to remove the filter, but this method is remarkably easier than the current method which involves wet analysis of test samples cut out from a dismantled filter. In addition, the filter is not destroyed, so that it can be reattached and used if it has enough residual exchange capacity.

Figure 3:
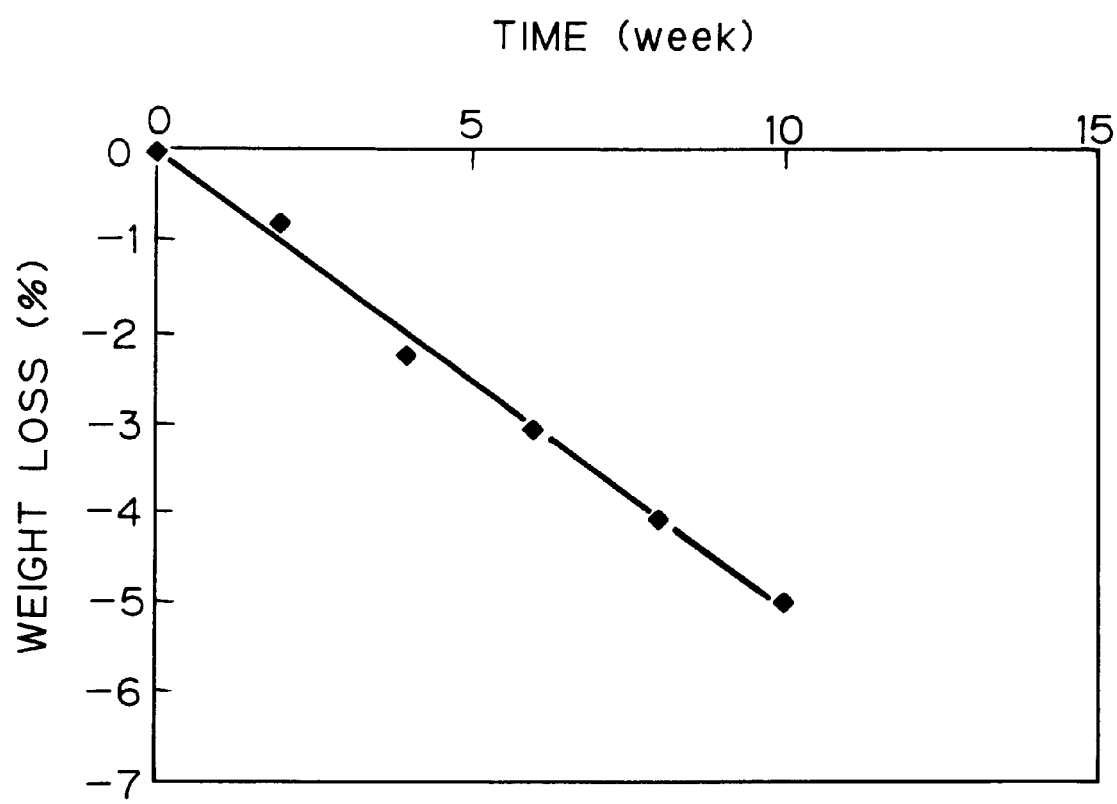
FIG. 3 is a graph showing correlation between the weight loss and change with time.

If the weight before use is determined and a weight change is determined at an instant during use of the filter, a graph of weight loss change with time as shown in FIG. 3 is obtained. Thus, the time for replacing the filter can be estimated by extending the line connecting the values before use and at said instant to reach a prescribed weight loss or other operation.

(2) Parallel-current filter

The filter can be removed and weighed, in the same manner as described for the cross-current filter.

The weight can be continuously determined, as the filter body and filter frame need not be tightly joined together in case of parallel current.

The weight of a filter element may range from 1 to 10 kg, and a change in the weight may range from about 0.05 to 1 kg. The weight can be exactly determined by applying weighing techniques using an ordinary spring balance or an electronic balance which monitors the weight by picking up electric signals.

In determining a pressure difference between an upstream and a downstream of the filter element, the pressure difference may be monitored over a long period so as to estimate the timing of replacing a filter element.

In some applications, a plurality of the filter elements are used in such cases that a uniform flow of a gas is not obtained; and that concentrations of gas components are not uniform. Even in these cases, an ion exchange capacity of each of the filter element can be determined, and the filter element that has consumed most ion exchange capacity can be replaced.

The characteristics of the present invention have been described mainly for the case in which ammonia is adsorbed by a strongly acidic, cation exchanger containing a sulfuric acid group, but other gas components or ion exchangers having other ion-exchange groups as mentioned above may also be applied to the present invention. For example, a weakly acidic, cation exchanger containing a carboxyl group, a strongly basic anion exchanger containing a quaternary ammonium group or a weakly basic anion exchanger containing a tertiary amino group can be applied to adsorb and remove hydrogen chloride or organic acids.

The above ion exchangers according to the present invention can be prepared by ordinary techniques, preferably as non-crosslinked graft polymers, particularly as ion exchangers prepared by irradiation-induced graft polymerization process.

Such ion exchangers are the most preferable materials to which the present invention is applied, because they rapidly adsorb and desorb water molecules as the ion-exchange group adsorbs gaseous components or the temperature or humidity varies.

Graft polymers include, for example, graft copolymers comprising a backbone polymer of polyolefin such as polyethylene, polypropylene or the like and a branch polymer of polyglycidyl methacrylate (GMA), polyacrylic acid, polystyrene or the like. Polyacrylic acid is obtained by polymerizing a monomer having an ion-exchange group, and GMA and styrene are monomers into which an ion-exchange group can be introduced after graft polymerization. The branch polymer preferably has a functional group, such as glycidyl group, capable of forming an ion-exchange sulfonic group by reacting with a sulfite. Styrene is preferably sulfonated with concentrated sulfuric acid or the like.

Radiation used in the irradiation-induced graft polymerization process is preferably γ rays and electron beams, which can be chosen at an appropriate dose depending on the nature of the backbone polymer. The backbone polymer treated with electron beams undergoes graft polymerization reaction with a comonomer forming the branch polymer by known methods, preferably by immersing the irradiated backbone polymer into a comonomer solution. The conditions for this graft polymerization reaction such as temperature, type of the solvent in the comonomer solution, concentration of the comonomer, reaction time can be appropriately chosen. The grafting degree can be appropriately chosen by choosing the above reaction conditions or the like, normally in the range of 20 to 250%.

The reaction to form an ion-exchange group on the resulting copolymer can be appropriately carried out by known methods.

The ion exchanger used in a chemical filter according to the present invention can be applied to the present invention in any form such as monofilament, assembly of monofilaments, woven or non-woven fabric thereof or shaped articles of such fabric (e.g. filter); powder or particles, or processed articles thereof (e.g. resin); beads, membrane, hollow filament membrane or processed articles thereof (e.g. hollow filament module); porous materials such as foam or processed articles thereof (e.g. sponge). Particularly, fibers, woven or non-woven fabric formed of fibers and processed articles thereof are the most preferable, because of their light weight, high water adsorption and desorption rate, small pressure loss and formability.

EXAMPLES

The following examples illustrate the present invention, but they are not intended to limit the scope of the invention.

In the following Examples, infrared moisture meter JE-100 from JT Engineering Inc. is used to determine a moisture content of the filter element. The infrared moisture meter has an optical system and a detecting portion, and the optical system has a light source such as a lamp, a lens for reflecting a light from the light source, and another lens for focusing the light, and a filter. The detecting portion is capable of detecting an infrared light reflected from a sample. Water has an absorption band at 1.2 mm, 1.45 mm, and 1.94 mm in the infrared to the near infrared region, and the moisture meter determines an absorption coefficient of at least one of the absorption bands for determining a moisture content. Preferably, a light having a reference wavelength in the infrared to the near infrared region, which is not susceptible to water may be used also. Then, a light having the absorption wavelength and another light having the reference wavelength are alternatively irradiated onto a sample to obtain a ratio of energy of both of the reflected lights for converting into an indicated value therefrom.

EXAMPLE 1

Preparation of a non-woven fabric of strongly acidic. cation-exchange fiber

A non-woven polyethylene fabric having a density of 50 g/m$^2$, a thickness of 0.4 mm and a fiber diameter of about 20 μm was irradiated with 100 kGy of electron beams (1 MeV, 1 mA) in a nitrogen atmosphere. Then, this non-woven fabric was immersed in a solution of glycidyl methacrylate for graft polymerization to attain a grafting degree of 148%. Then, the fabric was sulfonated in an aqueous solution of sodium sulfite and regenerated with hydrochloric acid and then dried to give a strongly acidic, cation-exchange non-woven fabric having an ion exchange capacity of 2.81 meq/g.

Performance evaluation with a near infrared moisture meter

Thus prepared non-woven fabric was cut into 10 cm×10 cm and subjected to a circulation test at an ammonia level of 1 ppm using a gas circulation tester as shown in FIG. 8. However, unlike FIG. 8, the cut non-woven fabric was used instead of the filter assembly 10, or the prefilter 38 was not disposed. An air having an ammonia concentration of 100 ppb at an inlet 42 was passed in a flow rate of 0.05 meter per second. The test was conducted in a clean room maintained at a constant temperature of 23° C. and a constant humidity of 55%.

In FIG. 8, an air line 50 and a mixing-gas line 60 are converged at a convergence 66 and connected to a gas passage 32. A pump 54 introduces an air having a temperature of 23° C. and a humidity of 55% in a clean room into the air line 50, and a flow meter 56 determines a flow rate of the air line. The mixing-gas line 60 includes a permeator for introducing a mixing gas such as ammonia into a carrier gas.

An initial moisture content of the non-woven fabric before the test started was 23%. This value was read from the indicated number of a near infrared moisture meter using a calibration curve preliminarily drawn. An initial pressure loss before the test at the non-woven fabric was 2.63 mmH$_2$O. This value was read from a differential pressure gauge 34. Using gas sampling lines 42, 44, ammonia concentrations in an upstream and a downstream of the fabric was determined at a prescribed interval. The initial removal efficiency was found to be 99% or more. When the removal efficiency fell below 95%, the circulation of ammonia was stopped. At this time, the moisture content was determined again by the near infrared moisture meter, which showed 14%. The pressure loss was 2.29 mmH$_2$O.

This filter was removed and the ion-exchange capacity was determined to be 0.8 meq/g. That is, about 70% of the ion exchange capacity was consumed, which revealed a proper time for replacing the filter.

Thus, the time for replacing a chemical filter and information for its performance evaluation such as removal efficiency can be continuously known without destroying the filter, by suitably monitoring the moisture content of the filter with a near infrared moisture meter. Similarly, the result shows that to replace the filter element upon decreasing the pressure loss from 2.63 mmH$_2$O to 2.39 mmH$_2$O is sufficient to prevent deterioration of the concentration of gas components at the outlet.

Incidentally, the moisture content can be calculated as follows:

$$\text{moisture content } (\%) = (w_1 - w_0)/w_0$$

wherein the symbols in the formula has the meanings as follows:

$w_1$ refers to a weight of a sample when determined; and
$w_0$ refers to a weight of a dry sample.

EXAMPLE 2

A filter assembly 10 as shown in FIG. 9 was prepared. The housing 12 is made of high purity polypropylene having dimensions of 300 mm×300 mm×150 mm in depth. The filter element 14 includes three laminated sheets of the non-woven fabric made of strongly acidic, cation-exchange fiber of Example 1. The filter element 14 in a pleated configuration was fixed to the housing 12 by an adhesive.

This filter assembly was fixed to a fan filter unit and operated in the aforementioned clean ream at a flow rate of 0.5 m$^3$/min.

A moisture content in an upstream surface of the filter element 14 was determined by a near infrared moisture meter 20 at a prescribed time interval. When the moisture content decreased by 12%, the operation was stopped and the filter assembly was replaced. During this period, the ammonia level in the clean room was 38 ppb on average and maintained at 3 ppb or less at the filter outlet.

The filter assembly 10 was removed and then dismantled. The ion-exchange capacity of the filter element 14 was determined to show an ion exchange capacity consumption of 74% on average, which corresponds to a residual ion exchange capacity of 26%, and the most upstream fabric in the filter element showed an exchange capacity consumption over 80%, which corresponds to a residual ion exchange capacity of less than 20%. This is an appropriate time to change the filter element.

Incidentally, the ion exchange capacity of the ion exchanger was determined as follows. The filter element, that is, the non-woven fabric made of the ion exchanger was cut to a prescribed dimension. Subsequently, the cut non-woven fabric was placed into a flask, and an aqueous solution of sodium chloride was added into the flask so as to immerse the fabric. Sodium ions in the solution exchange with ammonium ions and hydrogen ions, which form ionic bond with sulfonic acid groups in the fabric, thereby releasing hydrogen ion and ammonium ion. Subsequently, the solution obtained was titrated by an aqueous solution of sodium hydroxide for obtaining a concentration of hydrogen ion therein. The data allows to calculate an ion exchange capacity of the ion exchanger.

Thus, the time for replacing a chemical filter including a plurality of an ion exchange and its performance such as removal efficiency can be continuously determined without destroying or contacting the filter, by suitably monitoring the moisture content of the filter with a near infrared moisture meter.

EXAMPLE 3

A similar pleated filter as that of Example 2 was prepared, fixed to a similar fan filter unit and operated in a similar clean room.

The total weight of the filter (total of the filter material and filter frame) determined in equilibrium condition after standing for two days and nights at a constant temperature and a constant humidity before fixed was 2163 g. The filter material weighed about 1100 g.

The filter was removed every two weeks and weighed, with the results shown in FIG. 3. When the weight loss reached about −5% on the tenth week, the operation was stopped and the filter was dismantled to collect nine samples for ion-exchange capacity analysis. This weight loss of −5% corresponds to about 70% of the estimated weight loss when the filter material has reached about 100% ammonia. The residual exchange capacity of the collected samples was determined to be 31% on average. That is, 69% of ion-exchange capacity was consumed, which revealed a proper time for stopping the operation (time for replacing the filter).

As the graph of FIG. 3 shows, the weight loss profile is almost linear. Thus, the time for replacing a filter can be estimated by measuring a weight loss only once at an instant during this period and extending a line connecting the initial value and the determined weight loss. The time for replacement of a filter can be estimated in this way, though continuous determination is more preferred.

EXAMPLE 4

A similar pleated filter as that of Example 2 was prepared, fixed to a similar fan filter unit and operated in a similar clean room.

Figure 10:
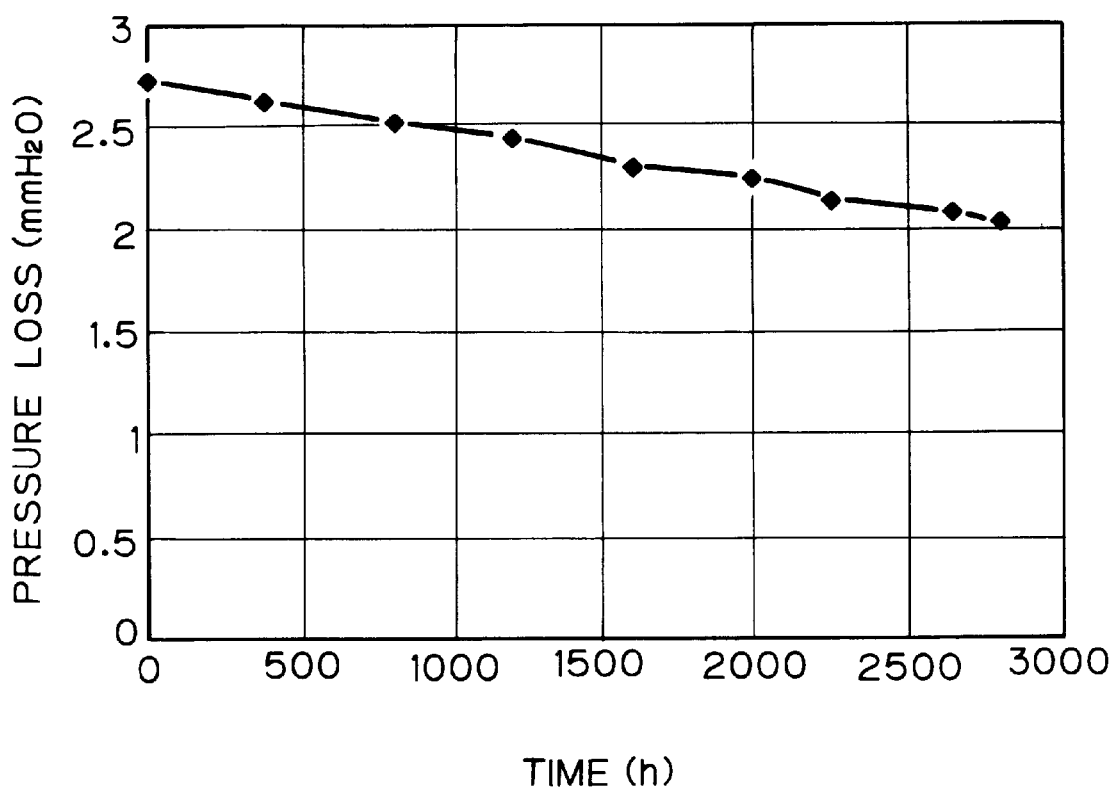
FIG. 10 is a graph showing correlation between time and a pressure difference between an upstream and a downstream of the filter element.

In an initial stage before passing a gas, a pressure difference between an upstream and a downstream of the filter element was 2.74 mmH$_2$O. A change of the pressure difference upon passing a gas, or a pressure loss over a period of time was shown in FIG. 10. A concentration of ammonia was maintained at about 70 ppb in the clean room and less than 5 ppb at the outlet of the filter element. When the pressure loss reached to 2.03 mmH$_2$O, the gas flow was stopped. The filter assembly was removed and dismantled. An ion exchange capacity of the filter element was determined to have a consumption of an ion exchange capacity of 71% on average, which corresponds to a residual ion exchange capacity of 29%. Therefore, a pressure loss can be an indicator for the timing of replacing a filter element.

EXAMPLE 5

10 filter assemblies of Example 2 was used to clean air having a temperature of 23° C. and a humidity of 55% in a clean room. An initial pressure loss was 8.0 mmH$_2$O at a flow rate of 60 m$^3$ per minute. An initial moisture content of the filter elements ranges from 21% to 23%. A concentration of ammonia at the inlet ranges from 10 to 60 ppb. During the operation of the filter assembly, a concentration of ammonia at the outlet was stable and below 1 ppb.

When the pressure loss decreases to 5.2 mmH$_2$O, the operation was stopped, and the moisture content of the ten filter elements were determined the near infrared moisture meter. 7 out of the 10 filter elements had a moisture content less than 15%.

The ten filter assembly was removed and dismantled. The filter element thereof was determined to have a residual ion exchange capacity of about 30% on average. Therefore, the result shows that the data of the pressure loss allows to estimate timing for replacing the filter element. The data of the residual ion exchange capacity confirms that it is sufficient to replace the seven filter elements having the lower moisture content.

The present invention allows to estimate timing for replacing a filter element without destruction thereof. Moreover, even a plurality of filter elements are used, timing for the replacement can be estimated for each of the filter element.

What is claimed is:

1. A method for evaluating performance of a chemical filter element for cleaning a gas, which method comprising the steps of:
    determining at least one of a moisture content and a weight of a filter element including an ion exchanger;
    comparing the determined value of a moisture content or a weight with a prescribed value of a moisture content or a weight;

replacing the filter element when the determined value is equal to or less than the prescribed value; and waiting a prescribed period when the determined value is more than the prescribed value and repeating the determining step and the comparing step subsequent to the waiting step;

wherein the prescribed value of a moisture content or a weight is smaller than an initial value of a moisture content or a weight of the filter element.

2. A method of claim 1, further comprising the step of maintaining the filter element at a prescribed temperature and a prescribed humidity prior to the determining step.

3. A method of claim 1, wherein a filter assembly comprises a housing and the filter element being fixed to the housing, and the replacing step includes replacing the filter assembly.

4. A method of claim 1, wherein another filter element is provided in an upstream of the filter element.

5. A method of claim 1, wherein the ion exchanger comprises an ion exchange group having strong acidity or strong basicity.

6. A method of claim 1, wherein the ion exchanger is made by irradiation-induced graft polymerization.

7. A method for evaluating performance of a chemical filter element for cleaning a gas, which method comprising the steps of:

determining at least one of a moisture content and a weight of a filter element including an ion exchanger;

converting the determined value of a moisture content or a weight into a residual ion exchange capacity of the filter element; and comparing the residual ion exchange capacity with a prescribed value.

8. A method of claim 7 further comprising the step of replacing the filter element when the residual ion exchange capacity is equal to or less than the prescribed value.

9. A method of claim 8, wherein a filter assembly comprises a housing and the filter element being fixed to the housing, and the replacing step includes replacing the filter assembly.

10. A method of claim 7, further comprising the step of waiting a prescribed period when the residual ion exchange capacity is more than the prescribed value and repeating the determining step, the converting step and the comparing step subsequent to the waiting step.

11. A method of claim 7 wherein the prescribed value for the residual ion exchange capacity ranges from 20% to 40% of an initial ion exchange capacity of the filter element.

12. A method of claim 7, further comprising the steps of:
maintaining the filter element at a prescribed temperature and a prescribed humidity prior to the determining step; and obtaining a calibration curve between a moisture content or a weight of the filter element and a residual ion exchange capacity of the filter element;

wherein the converting step comprises employing the calibration curve.

13. A method of claim 7, wherein the determining step comprises the steps of:

irradiating at least one of an infrared ray and a near infrared ray onto a surface of the filter element; and detecting at least one of an infrared ray and a near infrared ray reflected from the surface of the filter element.

14. A method of claim 7 wherein the determining step comprises said step of determining a moisture content of the filter element.

15. A method of claim 7, wherein another filter element is provided in an upstream of the filter element.

16. A method of claim 7, wherein the ion exchanger comprises an ion exchange group having strong acidity or strong basicity.

17. A method of claim 7, wherein the ion exchanger is made by irradiation-induced graft polymerization.

18. A method for evaluating performance of a chemical filter element for cleaning a gas, which method comprising the steps of:

providing a filter element including an ion exchanger in a gas passage;

determining a pressure difference between an upstream and a downstream of the filter element;

comparing the determined value of a pressure difference with a prescribed value of a pressure difference;

replacing the filter element when the determined value is less than the prescribed value; and waiting a prescribed period when the determined value is more than the prescribed value and repeating the determining step and the comparing step subsequent to the waiting step;

wherein the prescribed value of a pressure difference is smaller than an initial value of a pressure difference between an upstream and a downstream of the filter element.

19. A method of claim 18, further comprising the step of maintaining the filter element at a prescribed temperature and a prescribed humidity prior to the determining step.

20. A method for evaluating performance of a chemical filter element for cleaning a gas, which method comprising the steps of:

providing a filter element including an ion exchanger in a gas passage;

determining a pressure difference between an upstream and a downstream of the filter element;

converting the determined value of a pressure difference into a residual ion exchange capacity; and comparing the residual ion exchange capacity with a prescribed value.

21. A method of claim 20, further comprising the step of replacing the filter element when the residual ion exchange capacity is equal to or less than the prescribed value.

22. A method of claim 21, wherein a filter assembly comprises a housing and the filter element being fixed to the housing, and the replacing step includes replacing the filter assembly.

23. A method of claim 20, further comprising the step of waiting a prescribed period when the residual ion exchange capacity is more than the prescribed value and repeating the determining step, the converting step and the comparing step subsequent to the waiting step.

24. A method of claim 20, further comprising the steps of:
maintaining the filter element at a prescribed temperature and a prescribed humidity prior to the determining step; and obtaining a calibration curve between a residual ion exchange capacity of the filter element and a pressure difference between an upstream and a downstream of the filter element;

wherein the converting step comprises employing the calibration curve.

25. A method of claim 20, wherein another filter element is provided in an upstream of the filter element.

26. A method of claim 20, wherein the ion exchanger comprises an ion exchange group having strong acidity or strong basicity.

27. A method of claim 20, wherein the ion exchanger is made by irradiation-induced graft polymerization.

28. A method for evaluating performance of a chemical filter element for cleaning a gas, which method comprising the steps of:
   providing a filter element including an ion exchanger in a gas passage;
   determining a pressure difference between an upstream and a downstream of the filter element;
   comparing the determined value of a pressure difference with a prescribed value of a pressure difference;
   determining at least one of a moisture content and a weight of the filter element when the determined value of a pressure difference is equal to or less than the prescribed value; and
   waiting a prescribed period when the determined value of a moisture content or a weight is more than the prescribed value and repeating the pressure-difference determining step, and the comparing step subsequent to the waiting step;
   wherein the prescribed value of a pressure difference is smaller than an initial value of a pressure difference.

29. A method of claim 28, further comprising the steps of:
   comparing the determined value of a moisture content or a weight of the filter element with a prescribed value of a moisture content or a weight;
   replacing the filter element when the determined value of a moisture content or a weight is equal to or less than the prescribed value; and
   waiting a prescribed period when the determined value of a moisture content or a weight is more than the prescribed value and repeating the pressure-difference determining step and the pressure-difference comparing step subsequent to the waiting step
   wherein the prescribed value of a moisture content or a weight is smaller than an initial value of a moisture content or a weight.

30. A method of claim 29, wherein a filter assembly comprises a housing and the filter element being fixed to the housing, and the replacing step includes replacing the filter assembly.

31. A method of claim 28, further comprising the steps of:
   converting the determined value of a moisture content or a weight into a residual ion exchange capacity of the filter element; and
   comparing the residual ion exchange capacity with a prescribed value.

32. A method of claim 31, further comprising the step of replacing the filter element when the residual ion exchange capacity is equal to or less than the prescribed value.

33. A method of claim 31, further comprising the step of waiting a prescribed period when the residual ion exchange capacity is more than the prescribed value and repeating the pressure-difference determining step and the pressure-difference comparing step subsequent to the waiting step.

34. A method of claim 28, further comprising the step of maintaining the filter element at a prescribed temperature and a prescribed humidity prior to the pressure-difference determining step.

35. A method of claim 28, wherein the moisture-content-or-weight determining step comprises the steps of:
   irradiating at least one of an infrared ray and a near infrared ray onto a surface of the filter element; and
   detecting at least one of an infrared ray and a near infrared ray reflected from the surface of the filter element.

36. A method of claim 28, wherein another filter element is provided in an upstream of the filter element.

37. A method of claim 28, wherein the ion exchanger comprises an ion exchange group having strong acidity or strong basicity.

38. A method of claim 28, wherein the ion exchanger is made by irradiation-induced graft polymerization.

39. A method for evaluating performance of a chemical filter element for cleaning a gas, which method comprises the steps of:
   providing a filter assembly including an ion exchanger in a gas passage, wherein said filter assembly comprises a housing, and the filter element is fixed to the housing;
   determining a pressure difference between an upstream and a downstream of the filter element;
   comparing the determined value of a pressure difference with a prescribed value of a pressure difference;
   replacing the filter assembly when the determined value is equal to or less than the prescribed value; and
   waiting a prescribed period when the determined value is more than the prescribed value and repeating the determining step and the comparing step subsequent to the waiting step;
   wherein the prescribed value of a pressure difference is smaller than an initial value of a pressure difference between an upstream and a downstream of the filter element.

40. A method for evaluating performance of a chemical filter element for cleaning a gas, which method comprising the steps of:
   providing a first filter element including an ion exchanger in a gas passage, wherein another filter element is provided in an upstream of the first filter element;
   determining a pressure difference between an upstream and a downstream of the first filter element;
   comparing the determined value of a pressure difference with a prescribed value of a pressure difference;
   replacing the first filter element when the determined value is equal to or less than the prescribed value; and
   waiting a prescribed period when the determined value is more than the prescribed value and repeating the determining step and the comparing step subsequent to the waiting step;
   wherein the prescribed value of a pressure difference is smaller than an initial value of a pressure difference between an upstream and a downstream of the first filter element.

41. A method for evaluating performance of a chemical filter element for cleaning a gas, which method comprising the steps of:
   providing a filter element including an ion exchanger in a gas passage, wherein the ion exchanger comprises an ion exchange group having strong acidity or strong basicity;
   determining a pressure difference between an upstream and a downstream of the filter element;
   comparing the determined value of a pressure difference with a prescribed value of a pressure difference;

replacing the filter element when the determined value is equal to or less than the prescribed value; and waiting a prescribed period when the determined value is more than the prescribed value and repeating the determining step and the comparing step subsequent to the waiting step;

wherein the prescribed value of a pressure difference is smaller than an initial value of a pressure difference between an upstream and a downstream of the filter element.

42. A method for evaluating performance of a chemical filter element for cleaning a gas, which method comprising the steps of:

providing a filter element including an ion exchanger in a gas passage, wherein the ion exchanger is made by irradiation-induced graft polymerization;

determining a pressure difference between an upstream and a downstream of the filter element;

comparing the determined value of a pressure difference with a prescribed value of a pressure difference;

replacing the filter element when the determined value is equal to or less than the prescribed value; and waiting a prescribed period when the determined value is more than the prescribed value and repeating the determining step and the comparing step subsequent to the waiting step;

wherein the prescribed value of a pressure difference is smaller than an initial value of a pressure difference between an upstream and a downstream of the filter element.

* * * * *